(12) United States Patent
Lu et al.

(10) Patent No.: US 6,522,693 B1
(45) Date of Patent: Feb. 18, 2003

(54) SYSTEM AND METHOD FOR REENCODING SEGMENTS OF BUFFER CONSTRAINED VIDEO STREAMS

(75) Inventors: Ligang Lu, Somers, NY (US); Jack L. Kouloheris, Ossining, NY (US); Cesar A. Gonzales, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/511,859

(22) Filed: Feb. 23, 2000

(51) Int. Cl.[7] .................................. H04N 7/18
(52) U.S. Cl. ..................... 375/240.02; 375/240.25; 375/240.05
(58) Field of Search ................... 348/9–13; 375/240.02, 375/240.19

(56) References Cited

U.S. PATENT DOCUMENTS 5,231,484 A    7/1993   Gonzales
6,219,043 B1 *  4/2001   Yogeshwar et al. ........... 341/55
6,301,428 B1 * 10/2001   Linzer .................... 375/240.04

\* cited by examiner

Primary Examiner—Andy Rao
(74) Attorney, Agent, or Firm—Scully, Scott, Murphy & Presser; Daniel P. Morris, Esq.

(57) ABSTRACT

A system and method for generating an MPEG compliant video stream with satisfactory visual quality. The method employs re-encoding at a higher (or lower) bit rate, only the segments with unsatisfactory visual picture quality while retaining other parts of the original video stream and then merging the re-encoded segments with the remaining original portions. If the original video stream is coded at a reasonable bit rate, the number and length of those segments with unsatisfactory visual picture quality will be few and short. Re-encoding only those segments can save very significant amount of cost and only requires minimal additional storage space. Furthermore, the portions with satisfactory picture quality will be retained. The system and method is applicable to MPEG and non-MPEG compliant data streams.

26 Claims, 5 Drawing Sheets

SYSTEM AND METHOD FOR REENCODING SEGMENTS OF BUFFER CONSTRAINED VIDEO STREAMS

BACKGROUND OF THE INVENTION

1. Field of the Invention

This present invention relates generally to the field of data compression, and, more specifically, to a system and method for reencoding segments of buffer constrained video streams, such as MPEG video streams.

2. Discussion of the Prior Art

The digital video compression techniques are essential to many applications because the storage and transmission of uncompressed video signal requires very large amounts of memory and channel bandwidth. The dominant digital video compression techniques are specified by the international standards MPEG-1 (ISO/IEC 11718-2) and MPEG-2 (ISO/IEC 13818-2) developed by the Moving Picture Experts Group (MPEG), part of a joint technical committee of the International Standards Organization (ISO) and the International Electrotechnical Commission (IEC). These standards were developed for coding of motion pictures and associated audio signals for the variety applications involving the transmission and storage of compressed digital video, including high-quality digital television transmission via coaxial networks, fiber-optic networks, terrestrial broadcast or direct satellite broadcast; and in interactive multimedia contents stored on CD-ROM, Digital Tape, Digital Video Disk, and disk drives. The standards specify the syntax of the compressed bit stream and the method of decoding, but leave considerable latitude for novelty and variety in the algorithm employed in the encoder.

Some pertinent aspects of the MPEG-2 video compression standard will now be reviewed with further reference to commonly-owned U.S. Pat. No. 5,231,484, the contents and disclosure of which is incorporated by reference as if fully set forth herein.

To begin with, it will be understood that the compression of any data object, such as a page of text, an image, a segment of speech, or a video sequence, can be thought of as a series of steps, including: Step 1) a decomposition of that object into a collection of tokens; Step 2) the representation of those tokens by binary strings that have minimal length in some sense; and Step 3) the concatenation of the strings in a well-defined order. Steps 2 and 3 are lossless; i.e., the original data is faithfully recoverable upon reversal. Step 2 is known as entropy coding.

Step 1 can be either lossless or lossy. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 standard for Step 1 can be described as predictive/interpolative motion-compensated hybrid DCT/DPCM coding. Huffman coding, also known as variable length coding, is used in Step 2. Although, as mentioned, the MPEG-2 standard is really a specification of the decoder and the compressed bit stream syntax, the following description of the MPEG-2 specification is, for ease of presentation, primarily from an encoder point of view.

The MPEG video standards specify a coded representation of video for transmission. The standards are designed to operate on interlaced or noninterlaced component video. Each picture has three components: luminance (Y), red color difference (CR), and blue color difference (CB). For 4:2:0 data, the CR and CB components each have half as many samples as the Y component in both horizontal and vertical directions. For 4:2:2 data, the CR and CB components each have half as many samples as the Y component in the horizontal direction but the same number of samples in the vertical direction. For 4:4:4 data, the CR and CB components each have as many samples as the Y component in both horizontal and vertical directions.

An MPEG data stream consists of a video stream and an audio stream that are packed, with systems information and possibly other bit streams, into a systems data stream that can be regarded as layered. Within the video layer of the MPEG data stream, the compressed data is further layered. A description of the organization of the layers will aid in understanding the invention.

Figure 3:
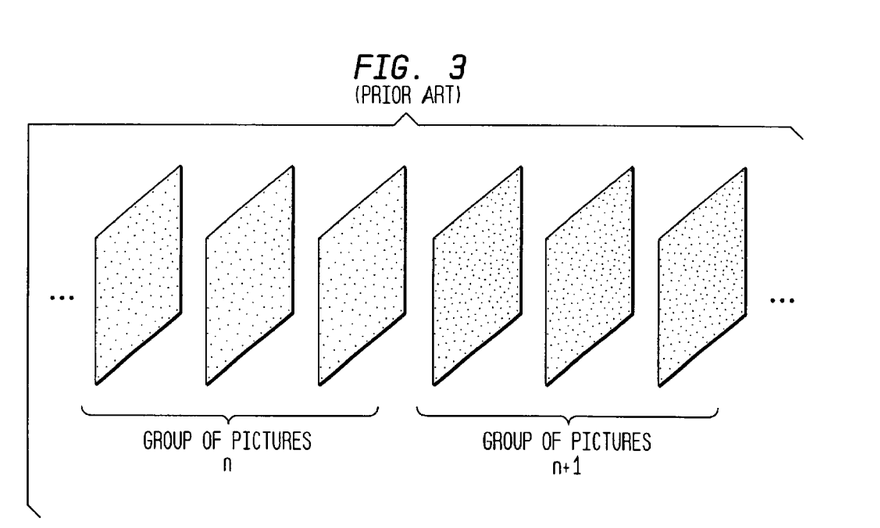
FIG. 3 illustrates an exemplary set of Group of Pictures (GOP's) layer of compressed data within the video compression layer of an MPEG data stream.

The layers pertain to the operation of the compression scheme as well as the composition of a compressed bit stream. The highest layer is the Video Sequence Layer, containing control information and parameters for the entire sequence. At the next layer, a sequence is subdivided into sets of consecutive pictures, each known as a Group of Pictures (GOP). A general illustration of this layer is shown in FIG. 3. Decoding may begin at the start of any GOP, essentially independent of the preceding GOP's. There is no limit to the number of pictures that may be in a GOP, nor do there have to be equal numbers of pictures in all GOP's.

Figure 4:
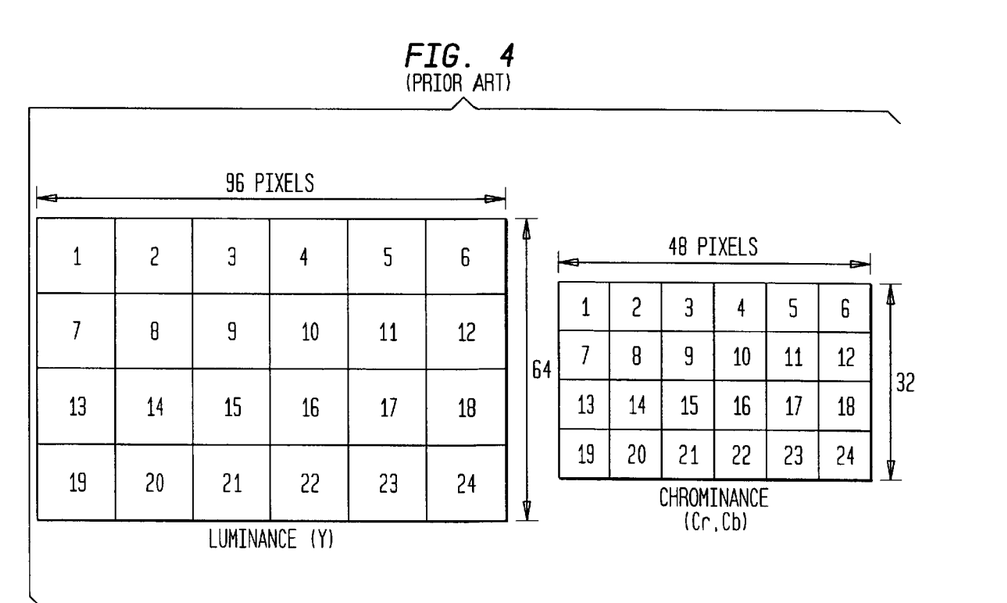
FIG. 4 illustrates an exemplary Macroblock (MB) subdivision of a picture in the MB layer of compressed data within the video compression layer of an MPEG data stream.

The third or "Picture" layer is a single picture. A general illustration of this layer is shown in FIG. 4. The luminance component of each picture is subdivided into 16×16 regions; the color difference components are subdivided into appropriately sized blocks spatially co-situated with the 16×16 luminance regions; for 4:4:4 video, the color difference components are 16×16, for 4:2:2 video, the color difference components are 8×16, and for 4:2:0 video, the color difference components are 8×8. Taken together, these co-situated luminance region and color difference regions make up the fifth layer, known as "macroblock" (MB). Macroblocks in a picture are numbered consecutively in raster scan order.

Between the Picture and MB layers is the fourth or "Slice" layer. Each slice consists of some number of consecutive MB's. Slices need not be uniform in size within a picture or from picture to picture.

Figure 5:
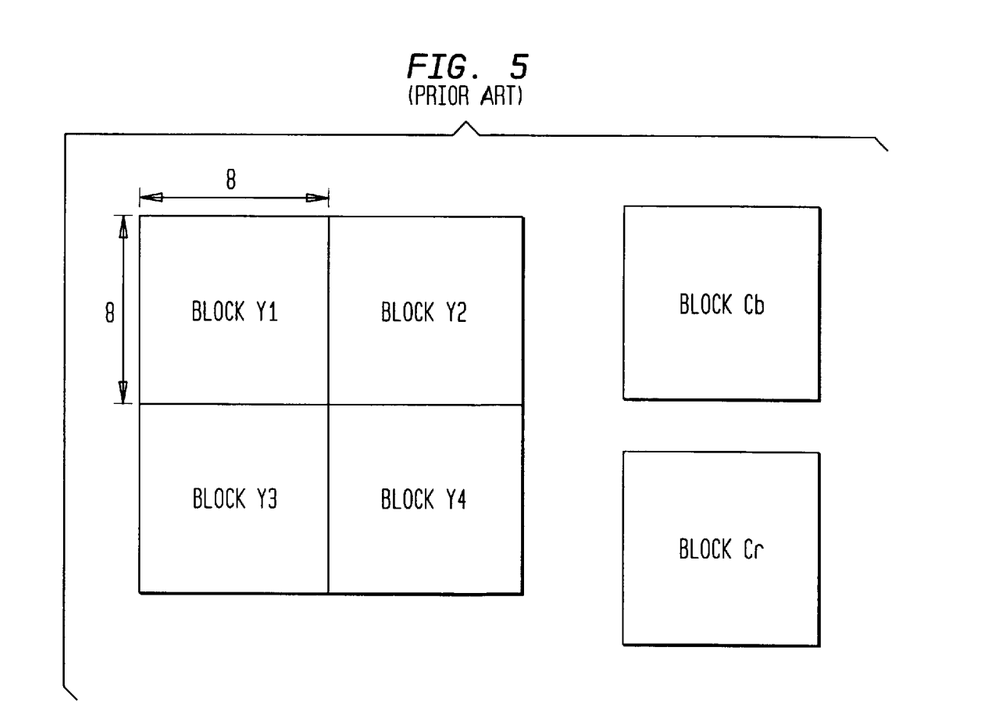
FIG. 5 illustrates the Block subdivision of a Macroblock.

Finally, as shown in FIG. 5, each MB consists of four 8×8 luminance blocks and 8, 4, or 2 (for 4:4:4, 4:2:2 and 4:2:0 video) chrominance blocks. If the width of the luminance component in picture elements or pixels of each picture is denoted as C and the height as R (C is for columns, R is for rows), a picture is C/16 MB's wide and R/16 MB's high.

The Sequence, GOP, Picture, and Slice layers all have headers associated with them. The headers begin with byte-aligned "Start Codes" and contain information pertinent to the data contained in the corresponding layer.

A picture can be either field-structured or frame-structured. A frame-structured picture contains information to reconstruct an entire frame, i.e., two fields, of data. A field-structured picture contains information to reconstruct one field. If the width of each luminance frame (in picture elements or pixels) is denoted as C and the height as R (C is for columns, R is for rows), a frame-structured picture contains information for C×R pixels and a frame-structured picture contains information for C×R/2 pixels.

A macroblock in a field-structured picture contains a 16×16 pixel segment from a single field. A macroblock in a frame-structured picture contains a 16×16 pixel segment from the frame that both fields compose; each macroblock contains a 16×8 region from each of two fields.

Each frame in an MPEG-2 sequence must consist of two coded field pictures or one coded frame picture. It is illegal, for example, to code two frames as one field-structured picture followed by one frame-structured picture followed by one field-structured picture; the legal combinations are: two frame-structured pictures, four field-structured pictures, two field-structured pictures followed by one frame-structured picture, or one frame-structured picture followed by two field-structured pictures. Therefore, while there is no frame header in the MPEG-2 syntax, conceptually one can think of a frame layer in MPEG-2.

Figure 6:
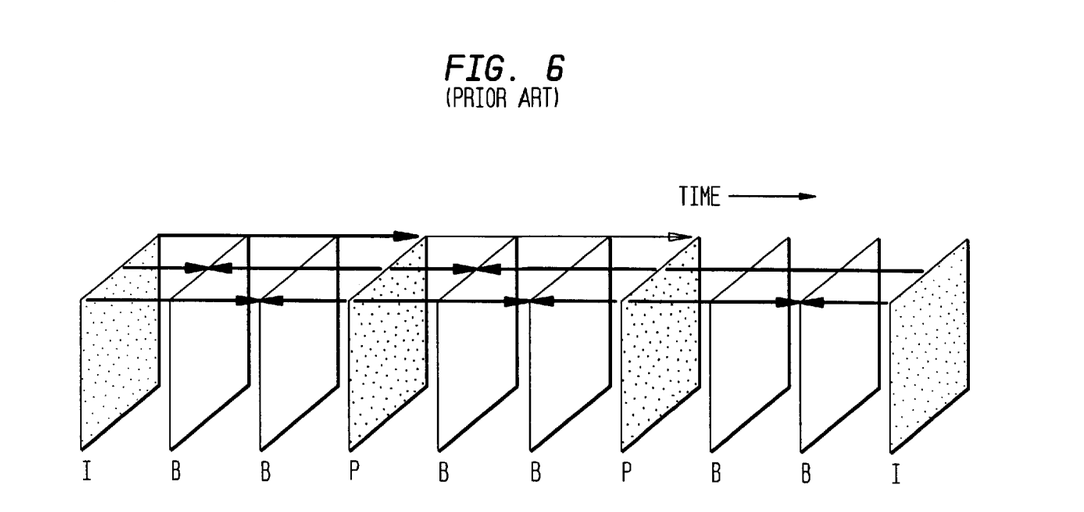
FIG. 6 illustrates the type of pictures in an exemplary Group of Pictures.

Within a GOP, three "types" of pictures can appear. An example of the three types of pictures within a GOP is shown in FIG. 6. The distinguishing feature among the picture types is the compression method used. The first type, Intramode pictures or I pictures, are compressed independently of any other picture. Although there is no fixed upper bound on the distance between I pictures, it is expected that they will be interspersed frequently throughout a sequence to facilitate random access and other special modes of operation. Predictively motion-compensated pictures (P pictures) are reconstructed from the compressed data in that picture and two most recently reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called reference pictures.

One very useful image compression technique is transform coding. In MPEG and several other compression standards, the discrete cosine transform (DCT) is the transform of choice. The compression of an I picture is achieved by the steps of 1) taking the DCT of blocks of pixels, 2) quantizing the DCT coefficients, and 3) Huffman coding the result. In MPEG, the DCT operation converts a block of 8×8 pixels into an 8×8 set of transform coefficients. The DCT transformation by itself is a lossless operation, which can be inverted to within the precision of the computing device and the algorithm with which it is performed.

The second step, quantization of the DCT coefficients, is the primary source of loss in the MPEG standards. Denoting the elements of the two-dimensional array of DCT coefficients by cmn, where m and n can range from 0 to 7, aside from truncation or rounding corrections, quantization is achieved by dividing each DCT coefficient cmn by wmn x QP, with wmn being a weighting factor and QP being the macroblock quantizer. Note that QP is applied to each DCT coefficient. The weighting factor wmn allows coarser quantization to be applied to the less visually significant coefficients.

There can be several sets of these weights. For example, there can be one weighting factor for I pictures and another for P and B pictures. Custom weights may be transmitted in the video sequence layer, or default values may be used. The macroblock quantizer parameter is the primary means of trading off quality vs. bit rate in MPEG-2. It is important to note that QP can vary from MB to MB within a picture. This feature, known as adaptive quantization (AQ), permits different regions of each picture to be quantized with different step-sizes, and can be used to equalize (and optimize) the visual quality over each picture and from picture to picture.

Typically, for example in MPEG test models, the macroblock quantizer is computed as a product of the macroblock masking factor and the picture nominal quantizer (PNQ).

Following quantization, the DCT coefficient information for each MB is organized and coded, using a set of Huffman codes. As the details of this step are not essential to an understanding of the invention and are generally understood in the art, no further description will be offered here.

Most video sequences exhibit a high degree of correlation between consecutive pictures. A useful method to remove this redundancy before coding a picture is motion compensation. MPEG-2 provides several tools for motion compensation (described below).

All the methods of motion compensation have the following in common. For each macroblock, one or more motion vectors are encoded in the bit stream. These motion vectors allow the decoder to reconstruct a macroblock, called the predictive macroblock. The encoder subtracts the predictive macroblock from the macroblock to be encoded to form the difference macroblock. The encoder uses tools to compress the difference macroblock that are essentially similar to the tools used to compress an intra macroblock.

The type of picture determines the methods of motion compensation that can be used. The encoder chooses from among these methods for each macroblock in the picture. A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, 16×16 (S) or 16×8 (E) motion compensation modes can be used. For F macroblock mode, dual-prime (D) motion compensation mode can also be used.

Figure 1:
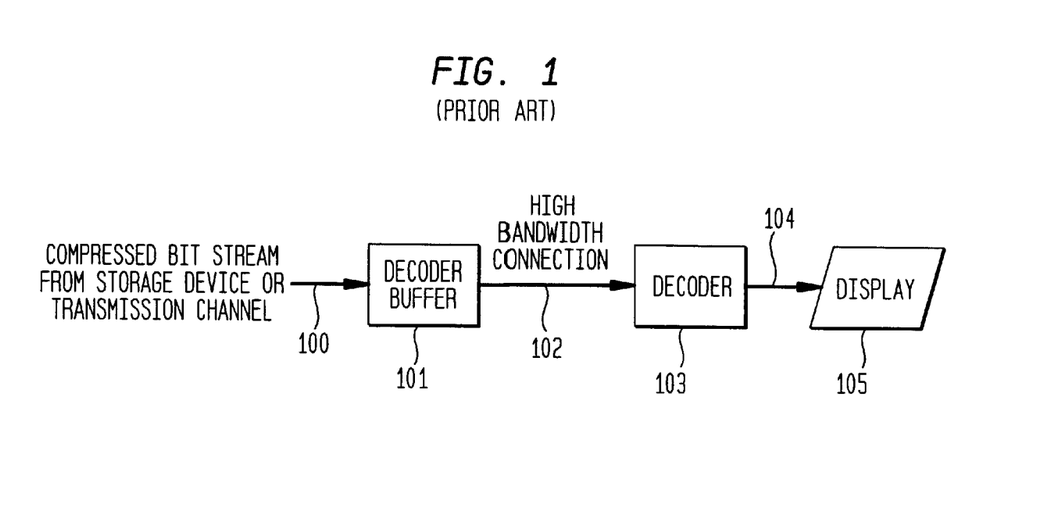
FIG. 1 is a physical depiction of the Virtual Buffer Verifier.
Figure 2:
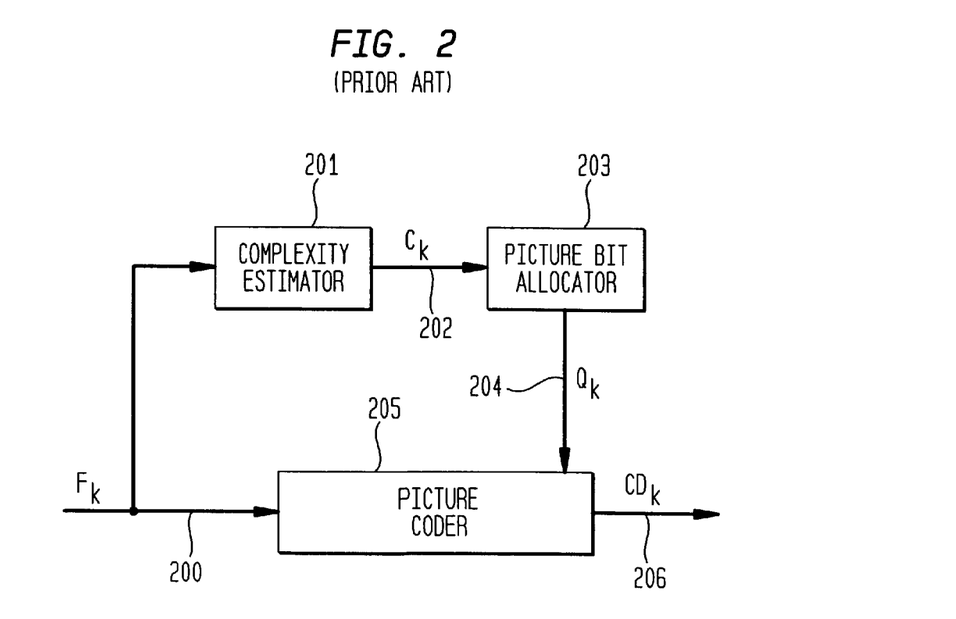
FIG. 2 is an overview of a conventional video compression system.

The MPEG standards may be used with both constant-bit-rate and variable-bit-rate transmission and storage media. The number of bits in each picture will be variable, due to the different types of picture processing, as well as the inherent variation with time of the spatio-temporal complexity of the scene being coded. The MPEG standards use a buffer-based rate control strategy, in the form of a Virtual Buffer Verifier (VBV), to put meaningful bounds on the variation allowed in the bit rate. As depicted in FIG. 1, the VBV is devised as a decoder buffer 101 followed by a hypothetical decoder 103, whose sole task is to place bounds on the number of bits used to code each picture so that the overall bit rate equals the target allocation and the short-term deviation from the target is bounded. The VBV can operate in either constant-bit-rate or variable-bit-rate mode.

In constant-bit-rate mode, the Decode Buffer 101 is filled at a constant bit rate with compressed data in a bit stream from the storage or transmission medium. Both the buffer size and the bit rate are parameters that are transmitted in the compressed bit stream. After an initial delay, which is also derived from information in the bit stream, the hypothetical decoder 103 instantaneously removes from the buffer all of the data associated with the first picture. Thereafter, at intervals equal to the picture rate of the sequence, the decoder removes all data associated with the earliest picture in the buffer.

Figure 7:
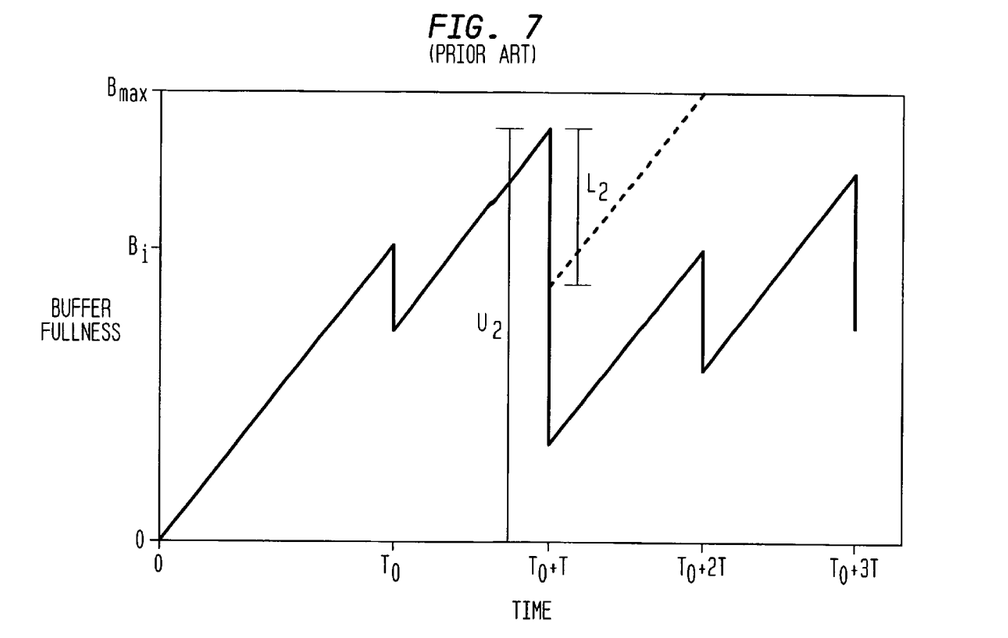
FIG. 7 illustrates an exemplary plot of the evolution of a virtual decoder buffer over time for operation in constant-bit-rate mode.

The operation of the VBV is shown by example in FIG. 7 which depicts the fullness of the decoder buffer over time. The buffer starts with an initial buffer fullness of Bi after an initial delay of time T0. The sloped line segments show the compressed data entering the buffer at a constant bit rate. The vertical line segments show the instantaneous removal from the buffer of the data associated with the earliest picture in the buffer. In this example, the pictures are shown to be removed at a constant interval of time T. In general, the picture display interval, i.e., the time interval between the removal of consecutive pictures, may be variable.

For the bit stream to satisfy the MPEG rate control requirements, it is necessary that all the data for each picture be available within the buffer at the instant it is needed by the decoder and that the decoder buffer does not overfill. These requirements translate to upper $U_k$ and lower $L_k$ bounds on the number of bits allowed in each picture (k). The upper and lower bounds for a given picture depend on the number of bits used in all the pictures preceding it. For example, the second picture may not contain more than $U_2$ bits since that is the number of bits available in the buffer when the second picture is to be removed, nor less than $L_2$ bits since removing less than $L_2$ bits would result in the buffer overflowing with incoming bits. It is a function of the encoder to produce bit streams that can be decoded by the VBV without error.

For constant-bit-rate operation, the buffer fullness just before removing a picture from the buffer is equal to the buffer fullness just before removing the previous picture minus the number of bits in the previous picture plus the product of the bit rate and the amount of time between removing the picture and the previous picture; i.e., buffer fullness before remove pic=buffer fullness before remove last pic−bits in last pic+(time between pic and last pic*bit rate)

The upper bound for the number of bits in a picture is equal to the buffer fullness just before removing that picture from the buffer. The lower bound is the greater of zero bits or the buffer size minus the buffer fullness just before removing that picture from the buffer plus the number of bits that will enter the buffer before the next picture is removed. The buffer fullness before removing a given picture depends on the initial buffer fullness and the number of bits in all of the preceding pictures, and can be calculated by using the above rules.

Figure 8:
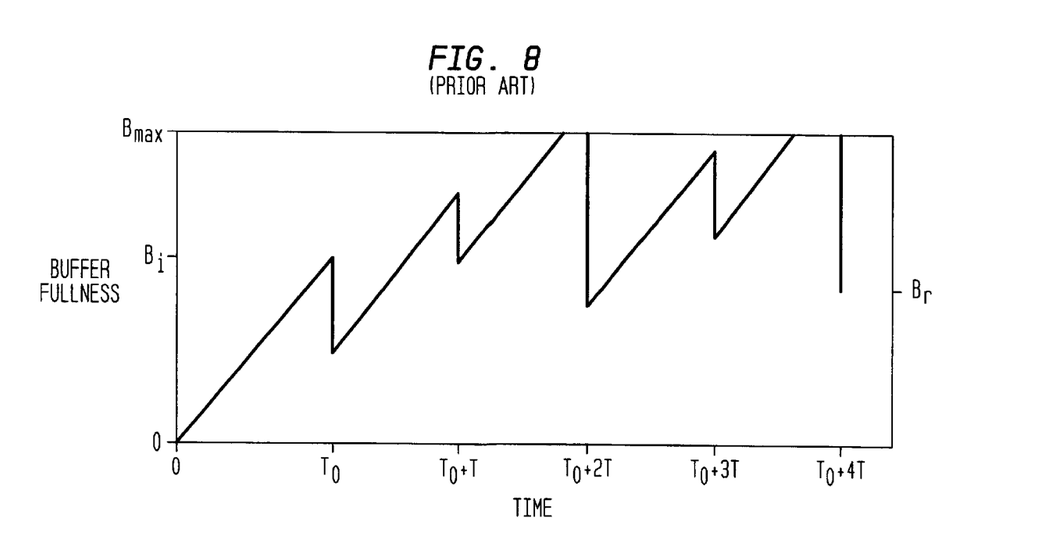
FIG. 8 illustrates an exemplary plot of the evolution of a virtual decoder buffer over time for operation in variable-bit-rate mode.

Variable-bit-rate operation is similar to the above, except that the compressed bit stream enters the buffer at a specified maximum bit rate until the buffer is full, when no more bits are input. This translates to a bit rate entering the buffer that may be effectively variable, up to the maximum specified rate. An example plot of the VBV fullness under variable-bit-rate operation is shown in FIG. 8. The buffer operates similarly to the constant-bit-rate case except that the buffer fullness, by definition, cannot exceed the buffer size of Bmax. This leads to an upper bound on the number of bits produced for each picture, but no lower bound.

For variable bit rate operation, the buffer fullness just before removing a picture from the buffer is equal to the size of the buffer or to the buffer fullness just before removing the previous picture minus the number of bits in the previous picture plus the maximum bit rate times the amount of time between removing the picture and the previous picture, whichever is smaller; i.e., buffer fullness before remove pic=min(buffer fullness before remove last pic−bits in last pic+time between pic and last pic*bit rate, buffer size)

The upper bound for the number of bits in a picture is again equal to the buffer fullness just before removing that picture from the buffer. As mentioned earlier, the lower bound is zero. The buffer fullness before removing a given picture again depends on the initial buffer fullness and the number of bits in all of the preceding pictures, and can be calculated by using the above rules.

The decoding requires that all the data for each picture is available within the buffer at the instant it is needed by the decoder. It is the function of the encoder to produce bit streams that conform to the VBV requirements, i.e., no buffer underflow occurrence in both CBR and VBR operations and no buffer overflow occurrence in CBR operation.

The international standards MPEG-1 and MPEG-2 are widely employed in applications involving digital video compression. In the production of MPEG compressed digital video contents, such as digital TV programs, DVDs, and other multimedia contents, there are often some segments of the video with unsatisfactory visual picture quality due to the varying complexity of the video content. The existing approach is to encode the entire program again at a higher bit rate with the intention to improve the picture quality of these segments. Since the programs or movies are one or two hours long, this reencoding approach not only consumes twice much of the production time but also can waste very significant amount of the storage media and transmission bandwidth. For example, to reencode a two hour long movie at a bit rate of 5 Mbits/sec, which was previously coded at 3 Mbits/sec, will take at least another 2 hours and additional storage space of 14400 Mbits; this is a 67% increase. Furthermore, there is no guarantee that the reencoded video stream will have a satisfactory picture quality. The reencoding process may have to be repeated at an even higher bit rate, wasting a lot of time, storage space, and transmission bandwidth unnecessarily on the segments that already have satisfactory visual quality.

Therefore better solutions for reencoding problem are needed to greatly improve the production efficiency and reduce the cost.

SUMMARY OF THE INVENTION

It is an object of the invention to provide a system and method for reencoding only the segments which have unsatisfactory visual quality in a video stream so that significant production time, storage space, and bandwidth can be saved.

According to one aspect of the invention, there is provided a system and reencode methodology that includes: 1) the step of allocating the target number of bits to each picture in the specified segment to be reencoded in accordance with the user desired average bit rate or the limits of the VBV buffer constraints; 2) the step of reencoding the segment according to the target bits allocation, and, 3) the steps of merging the stream of the reencoded segment with the original stream to replace the original segment and verifying that the merged stream will still conform to the VBV buffer constraints.

In one embodiment of the invention, the step 1) of allocating the target number of bits to the pictures uses the information obtained by an information collection unit. The information including, for instance, the measures of the picture quality index, the complexity, the coding bits used, the average quantization scale, and the coding type of each picture coded in the original bit stream. It also includes the special and spatial-temporal activity measures as well as the information of GOP structure, resolution, format, etc. The information may either be obtained by on-line collecting during the previous encoding which produced the original stream or by off-line analyzing the bit stream and video source. In the preferred embodiment, the information is collected during the encoding and stored in a statistical file. The target allocation step also preferably invokes a method for dividing the segment into intervals with relatively homogeneous contents. The available bits for re-encoding the segment are derived from the user desired average bit rate and are then allocated among the pictures in the segment based on the picture quality measures and the picture complexities derived from the information in the statistical file. The target allocation step 1) also implements a procedure for calculating the minimum required VBV buffer fullness at the end of the segment and the procedure to adjust the target allocation so that the bit stream of the reencoded segment itself and the combined new bit stream after it is merged into the original bit stream will still conform to all the VBV buffer constraints.

The reencoding step 2) encodes the corresponding segment of the signal source again and produces a new bit stream for the segment along with the associated statistical file. During the encoding, this step may preferably invoke a rate control method so that the actual bits spent on each picture are close to the allocated target bits. The segment may be re-encoded at a higher or lower bit rate than the encoded bit rate for the segment of the original stream.

The merging step 3) first verifies that if the old segment in the original bit stream is replaced with the new bit stream generated by reencoding, the resulting stream is indeed compliant to the VBV buffer constraints. If this is true, the new bit stream is merged into the original bit stream to replace the old segment. In the preferred embodiment, the statistical file corresponding to the reencoded segment is also merged into the original statistical file so that the segments in successive reencoding may be overlapped.

Advantageously, the system and method of the invention is applicable to any encoded bit stream and encompasses both audio and video applications. dr

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

As the present invention may be applied in connection with an MPEG-2 encoder, it is understood that invention may also be applied to other coding algorithms which share some features of the MPEG-2 standard.

Figure 9:
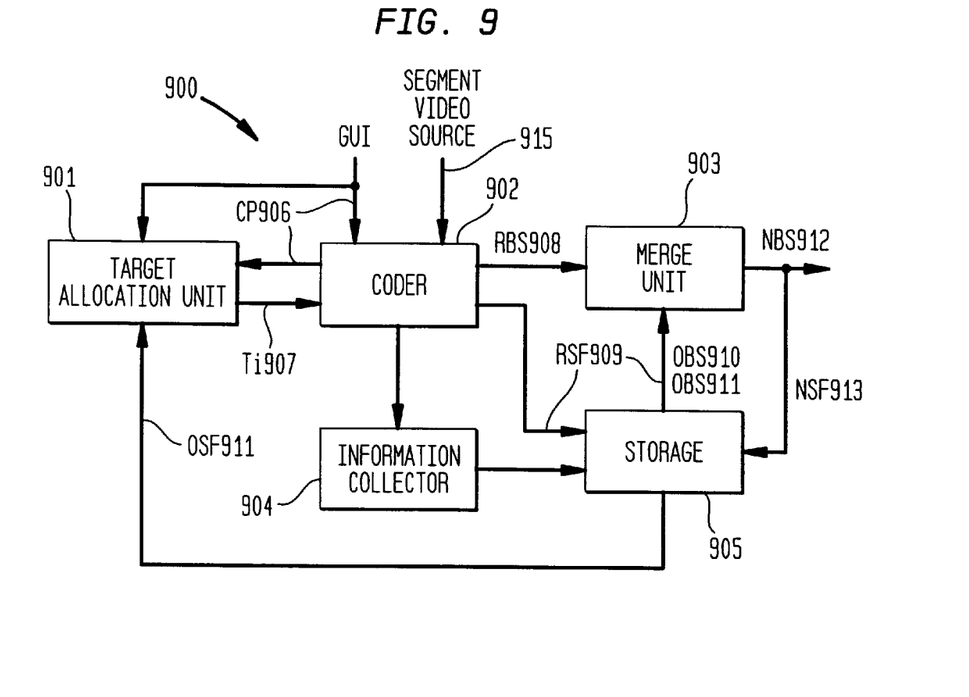
FIG. 9 illustrates a block diagram of the preferred embodiment of the present invention; and, FIG. 10 illustrates an exemplary plot of the segments and intervals of pictures according to the principles of the invention.

FIG. 9 is a block diagram of a reencoding system 900 according to the preferred embodiment. As shown in FIG. 9, the system 900 includes a target bit allocation unit 901, an encoder device 902, a merger unit 903, an information collection unit 904, and a memory device 905. The encoder device 902 and the memory device 905 are of conventional components. In the preferred embodiment, the encoder device 902 is an MPEG-2 encoder or like equivalent employing an encoding algorithm. Each of the component units of the reencoding system 900 may be embodied in hardware or as software installed in the memory of a general purpose computer. In the embodiment of the invention the encoder 902 is an integrated circuit chip with associated control microcode and is installed on a circuit board along with input/output (I/O) interface. The card is plugged on a conventional PC computer. The target bit allocation unit 901 and the merger unit 903 are implemented in software and reside on the memory device of the PC computer along with the graphic user interface (GUI) software. The segment of the pictures to be reencoded and the desired bit rate to reencode the segment may either be specified by the user through the GUI or, be determined by applying some automatic algorithm involving the use of some picture quality measurement. In the preferred embodiment, the segment to be reencoded and the desired reencoding bit rate are specified by the user.

Given the user desired average bit rate and the segment 915 for reencoding, the target bit allocation unit 901 calculates a target number of bits $T_i$ 907 for each picture $F_i$ in the segment based on the coding parameters ("CP") 906 from the GUI (including the user desired bit rate) and the information in the Original Statistics File ("OSF") 911 from the storage device 905. If the limits imposed by the VBV buffer constraints do not allow to perform the reencoding at the user desired bit rate, the target allocation unit 901 will calculate target number of bits $T_i$'s according to the VBV buffer constraints so that the reencoding average bit rate is the closest to the user desired bit rate while still conforming to the VBV buffer constraints. The statistics provided in the OSF 911 include information related to the previous encoding of the original video source and may be obtained by on-line collecting during encoding or by off-line analyzing of the bit stream and the original video source. In the preferred embodiment, the SI is obtained by on-line collecting.

For each picture $F_i$ coded in the Original Bit Stream ("OBS") 910, the OSF contains the information of picture coding type (I, P, or B) $TP_i$, and the bits $b_i$ and the average quantization scale $Q_1$ used in encoding $F_i$. The OSF additionally includes the Picture Quality Index $PQI_i$ which may either be an objective fidelity measurement between the reconstruction and the original source of $F_i$ or some kind of subjective measurement incorporating human visual system's characteristics or an hybrid of both. In the preferred embodiment, $PQI_i$ is the measurement of the accumulated difference between the corresponding pixel values of the reconstructed picture and the original picture. So the smaller the $PQI_i$ value, the better the picture quality. The OSF also includes the measures of spatial or spatio-temporal activity $A_i$ which is used in estimating the picture coding complexity and also in dividing of the segment into intervals with similar contents. The definition of those activity measures depends on the actual type and the nature of the signal. In the preferred embodiment, $A_i$ is the spatial activity calculated as the variance of the pixel values of the picture $F_i$. Since the variance is a widely known parameter in the art, it is not described further.

In further view of FIG. 9, the target bit allocation $T_i$ 907 for each picture is then sent to the encoder 902 which uses the target bit allocation and the user desired average bit rate to guide the bit usage in reencoding the specified segment of the video source. In general, the encoder 902 has its associated rate control mechanism (not shown) to regulate the actual bits usage as close to the target allocation as possible. As a result, the encoder 902 generates a Reencoding Bit Stream ("RBS") signal 908 corresponding to the segment. The merger unit 903 verifies that the RBS 908 conforms to all the VBV buffer constraints and merges RBS 908 into the OBS signal 910 to replace the original segment and generate a New Bit Stream ("NBS") signal 912. The corresponding statistics file "RSF" 909 of the RSB is also merged with the statistics file OSF 911 of the OBS to generate a new statistics file ("NSF") 913 for the NBS so that any successive segment reencoding may have overlapping segments.

The reencoding segment process is now described in further detail. For simplicity, the preferred embodiment is described with respect to the VBR coding operation. However, it is understood that the description for the CBR coding operation may be obtained by very simple and straightforward modification.

In segment reencoding of the buffer constrained video stream, the reencoded segment should conform to all the buffer constraints and extra cares must also be taken so that the merged stream is also buffer compliant. The MPEG-2 standard has introduced a hypothetical decoder called the Virtual Buffer Verifier (VBV) to facilitate the description and design of the system. VBV is used to verify whether an encoded bit stream is decodable with specified limitations on the decoder buffer size and the bit rate. In VBR coding, the compressed bit stream enters the buffer from storage or transmission medium at a specified maximum bit rate until the buffer is full, at which point no more bits are input until the buffer is at least partially empty. This means that the rate entering the buffer is effectively variable. Both the buffer size and the bit rate are parameters transmitted in the compressed video stream. After an initial delay, which is specified as the buffer size by the standard, the decoder instantaneously removes from the buffer all the data of the first picture. Thereafter, at intervals equal to the picture rate, the decoder removes all the data associated with the earliest picture in the buffer. The decoding requires that all the data for each picture is available within the buffer at the instant it is needed by the decoder. This is equivalent to the constraint of no occurrence of buffer underflow. It is the function of the encoder to produce bit streams that conform to all the VBV constraints.

To analyze the buffer constraints for segment reencoding, it is necessary to ascertain the buffer levels before removing picture data. However, in VBR coding, the VBV delay information is not readily available in the video stream and has to be derived recursively. To facilitate the description, the following notations are introduced:

Without losing generality, let $S_1$, $S_2$, $S_3$ represent three segments of the original video stream S with $S_2$ being the portion to be reencoded and $S_1$, $S_3$ the portions before and after $S_2$ respectively. The reencoded segment is denoted as $S_2'$, and the new video stream after merging the segments $S_1$, $S_2'$, $S_3$ as S'. Let the picture numbers in the segments be $[1, \ldots, N_1]$; $[N_1+1, \ldots, N_2]$; $[N_2+1, \ldots, N_3]$ respectively. Thus the total number of pictures in the original video stream S is $N_3$ and it will remain the same in the merged stream S' after the reencoding. Let $b_i$ and $b_i'$ be the numbers of bits used for encoding the $i^{th}$ picture in the original stream S and in the reencoded stream S' respectively, where $i=1, \ldots, N_3$. Similarly, $B_i$ and $B_i'$ denote the buffer levels before removing the coded data of the $i^{th}$ picture in S and S' respectively. Note that $B_i=B_i'$, $i=1, \ldots, N_1$ and in general, not equal for other values of i because if the number of bits for any picture changes, the buffer levels for all pictures following it get affected. Let $R_{max}$ represent the rate at which the VBV buffer fills and T the display time per picture. The coded picture data is removed from the buffer at time differences corresponding to the display interval for a picture. The VBV buffer levels in VBR operation may be calculated recursively, $$B_1 = B_{size} \tag{1a}$$

$$B_k = \min\{B_{k-1} - b_{k-1} + R_{max}T, B_{size}\} \tag{1b}$$

Where $B_{size}$ is the VBV buffer size. Equation (1a) follows from the MPEG-2 standard that specifies that the first picture is removed from the VBV buffer after the buffer is full. Equation (1b) follows by noting that the VBV buffer model assumes that the buffer stops filling when it is full.

Besides the no buffer underflow constraint in the reencoded segment $S_2'$, there are two additional buffer constraints for the segment reencoding. First the buffer level at the start point of the segment $S_2'$ is constrained by the buffer level at the end of the previous segment $S_1$. That is, $$B_{N1+1} = \min\{B_{N1-1} - b_{N1} + R'_{max}T, B_{size}\} \tag{2}$$

where $R'_{max}$ is the new maximum bit rate in reencoding the segment $S_2$. This constraint can be satisfied by setting the initial delay to $B'_{N1+1}$ when reencode $S_2$.

The second additional buffer requirement is that the buffer level at the end of $S_2'$ is constrained by a minimum allowable buffer level at the start of the following segment $S_3$. An observation is now presented which is useful to the analysis of the problem.

Observation

Consider two MPEG-2 VBR video streams with the same maximum rate $R_{max}$ and the number of encoded pictures N in each stream. Let $b_i^1$ and $b_i^2$ be the numbers of bits used for encoding the $i^{th}$ picture $F_i$ and $B_i^1$ and $B_i^2$ the buffer levels before removing the data of the $i^{th}$ picture in each stream respectively. It may be readily proven that if $B_i^1 \geq B_i^2$ and $b_i^1 \leq b_i^2$, $i=1, \ldots, N$, then if the second stream has no buffer underflow, the first stream also has no buffer underflow.

Now consider the additional buffer constraint at the end of the reencoded segment $S'_2$. Assuming that the segment has been reencoded such that the stream $\{S_1 S_2'\}$ is compliant to all the buffer constraints. Then, whether the merged stream $\{S_1\ S_2'\ S_3\}$ is also compliant with all the constraints will depend on the buffer level before removing the first picture in the segment $S_3$.

If $B'_{N_2+1}$ in the new stream S' is greater or equals to $B_{N2+1}$ in the original stream S, then, from the above-identified observation, S' is also compliant since $b'_k = b_k$ and $B_k^1 \geq B_k$, $\forall k = N_2+1, \ldots, N_3$. Otherwise, if $B'_{N_2+1} < B_{N_2+1}$, there exist possibilities of buffer underflows. To ensure that the merged stream is also buffer compliant, a minimum allowable value of $B'_{N_2+1}$ needs to be determined. An algorithm is now presented to determine this value $B'_{min,N_2+1}$.

Minimum Allowable Buffer Level Search Algorithm

Step 1. Clearly $b_{N_2+1} \leq B'_{min,N_2+1} \leq B_{N+1}$ so initialize $B = b_{N_2+1}$; select an increment $B_\Delta = \delta > 0$;

Step 2. Set the index k=$N_2$+2 and the flag underflow=0. Set $B'_{N_2+1}$=B. For k=$N_2$+2 to $N_3$ do the following:

$$B'_k = \min\{B'_{k-1} - b_{k-1} + R^*T), B_{size}\};$$

if $B'_k = B_{size}$, go to Step 3;
else if $B'_k > b_k$, k=k+1, continue;
 else set underflow=1, go to Step 3.
Step 3. If underflow=0, $B'_{min,N_2+1}$=B; set B=B+$B^{66}$ if $B \leq B_{N_2+1}$, go to Step 2; Otherwise stop.

In the above, the underflow condition in $S_3$ only needs to be checked until the point where the full buffer level is reached. This is a direct consequence of the observation and thus reduces the computation significantly.

The rate allocation algorithm for reencoding $S_2$ so that the compliance is fully maintained, is now presented.

Rate Allocation for Segment Reencoding

Given the user desired average bit rate and the segment for reencoding, the bit allocation algorithm calculates a target number of bits $T_i$ for each picture i in the segment based on the statistics information obtained when encoding the original stream. It is assumed that the GOP structure and the picture coding type of each picture are kept the same in the segment reencoding. If the limits imposed by the buffer constraints do not allow to perform the reencoding at the user desired bit rate, the algorithm will perform the bit allocations such that the reencoding average bit rate is as close to the user desired bit rate as possible while still conforming to the VBV buffer constraints.

Figure 10:
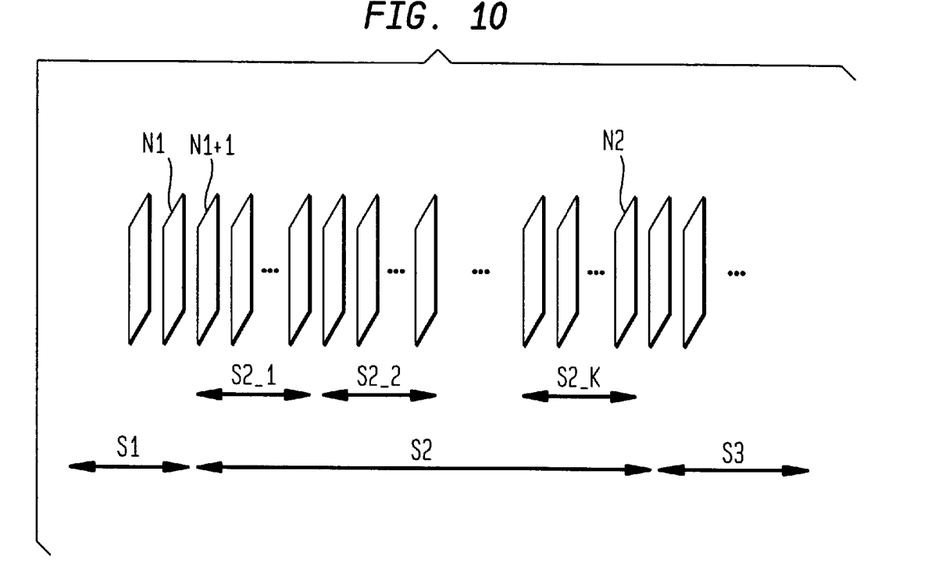

The algorithm first divides $S_2$ into K intervals, $S_{21}, \ldots, S_{2K}$. So that the pictures in each interval contain relatively similar content. Many existing scene change detection methods can be used for this purpose. Long intervals may be further divided into smaller intervals with selected length, for instance, of a few GOPS. FIG. 10 illustrates the picture index in each segment. In the preferred embodiment, an existing scene detection method is used to break the segment into several intervals. The average bit rate for reencoding $S_2$ is denoted as $R_{ave}$, and the maximum bit rate is denoted $R_{max}$. Let $f_s$ be the picture rate in pictures per second, then the average bits per picture $b_p = R_{ave}/f_s$. Let $Q_i$ be the average quantization scale used in encoding the picture $F_i$ in the original stream and denote the picture quality index as $PQI_i$ which can either be an objective fidelity measurement between the reconstruction and the original source of $F_i$ or some kind of subjective measurement incorporating human visual system's characteristics or, a hybrid of both. The target allocation algorithm is performed in the following steps.

Rate Allocation Algorithm

Step 1. For each interval $S_{2k}$ in $S_2$, k=1, 2, ..., K, calculate the average picture quality for each picture coding type I, P, and B:

$$PQI^t_{S_{2k}} = \frac{\sum_{TP_l=t, l \in S_{2k}} PQI_l}{n_t}$$

where $t \in \{I, P, B\}$; $TP_l$ and $PQI_l$ are the picture coding type and the picture quality index of the picture $F_l$, respectively, and $n_t$ is the number of pictures of coding type t in the interval $S_{2k}$.

Step 2. For each picture $F_i$ of coding type t in interval $S_{2k}$, the target number of bits $$T_i = \frac{c_i PQI_i}{\left(\sum_{TP_l=t, l \in S_{2k}} c_l\right) PQI^t_{S_{2k}}} n_k b_p W_t$$

where $n_k$ is the number of pictures in $S_{2k}$, $b_p$ is the average number of bits/picture, and $c_i$ is the complexity of $F_i$ defined as:

$$c_i = \frac{1}{A_i} b_i Q_i$$

where $A_i$ is the activity measure of $F_i$, $b_i$ and $Q_i$ are the actual number of bits and the average quantization scale used to encode the original picture $F_i$ in the original bit stream, respectively. $W_t$ is a weighting factor for picture coding type of t, $t \in \{I, P, B\}$ and may vary in accordance with a particular encoding technique. Note, that in the above equation, the target number of bits $T_i$ is allocated according to the ratio of the current picture complexity $c_i$ to the total picture complexity in $S_{2k}$ but further weighted by the ratio of the picture quality index $PQI_i$ to the average picture quality of the same picture coding type in $S_{2k}$. Thus the pictures of the same type will be coded to achieve similar or smoother picture quality in the interval with similar content.

Step 3. If the user requires a minimum average bit rate $R_{min}$ or a minimum number of bits per picture, adjust $T_i$ to meet the requirement.

$$T_i = \max\{b_{p,min}, T_i\}$$

where $b_{p,min} = R_{min}/f_s$.

Step 4. To ensure that after the reencoded segment is merged with the other portions of the original stream, the new stream will conform to all the buffer constraints; this step makes target allocation adjustments if the calculated target allocation would cause any violation of the buffer constraints.

Let i be the pointer to the current picture index position and $i_1$ be the pointer to the picture index position where the last full buffer level is reached or to the initial position if no full buffer level has occurred. Likewise let $i_2$ be the pointer to the picture index position where a possible underflow is detected. In the case of a potential underflow is found, the target allocation adjustment is only necessary to the pictures between $i_1$ and $i_2$ since $B'_{i_1}$ is already at the full VBV buffer size and can not be increased. Initially i=$i_1$=$i_2$=$N_1$+1, i.e., at the start point of $S_2$. The procedure to check the VBV buffer compliance and adjust the target allocation is as follows:
Step 4a. If $T_i \geq B'_{i_1} - G$ go to Step 4b; otherwise do the following:

$$B'_{i+1} + \min\{B_{size}, B'_i + (R_{max}*T) - T_i\};$$

where G is the guard band (predetermined number of bits) to prevent buffer underflow in case there is significant divergence between the target number of bits and actual used coding bits.

Set i=i+1; if $B'^i = B_{size}$, a full buffer is reached at this point and set $i_1$=i to move the pointer to the current picture position. Then, go to Step 4c.

Step 4b. Here a potential underflow is found at the current picture index i so the target allocation adjustment is needed. First set $i_2$=i. Then, calculate the amount of bits overallocated $$\Delta_{OVER} = T_i - (B'_i - G).$$

The total amount of target bits allocated to all the pictures between the interval $i_1$ and $i_2$ is $$\sum_{l=i_1}^{i_2} T_l.$$

The adjustment factor $\alpha$ is defined as:

$$\alpha = \frac{\sum_{l=i_1}^{i_2} T_l - \Delta_{over}}{\sum_{l=i_1}^{i_2} T_l}$$

Then, the target allocation for all pictures between $i_1$ and $i_2$ is adjusted as follows:

$$T_1 = \alpha * T_1, \ 1 = i_1, i_1 + 1, \ldots, i_2.$$

Finally, the current picture position $i = i_1$ is set and go to Step 4c.

Step 4c. If $i \leq N_2$ go to Step 4a; otherwise, check if the buffer level at the start of $S_3$ satisfies the minimum required buffer level $B'_{min,N_2+1}$. If $B'_{N_2+1} \geq B'_{min,N_2+1}$ stop; otherwise, go to Step 4b but set $\Delta_{OVER} = B'_{min,N_2+1} - B'_{N_2+1}$.

Although the invention has been described for MPEG encoding, it is understood that it is applicable with other video coding techniques or even with non-video data. Indeed, any digital information can be divided into coding units and bits are allocated to the coding units for constant bit rate or variable bit rate encoding. The coding units can then be encoded based on the target allocation. Furthermore, the techniques described for segment reencoding may be applied whether or not the data is video. For example, digital audio or digitized speech can be divided into frames in millisecond units. These frames can be treated the same as the video pictures and the invention can be applied to a segment of these coding units for reencoding.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

having thus described our invention, what we claim as new, and desire to secure by Letters Patent is:

1. A method for reencoding a signal source corresponding to a previously encoded segment of a plurality of ordered segments including data comprising an original bit stream, each segment including a plurality of ordered coding units, the method comprising steps of:

allocating a target number of bits for each said coding unit as a function of a quality measurement, an estimated coding complexity, a number of coding units per unit time interval of said original bit stream, and a target average bit rate per coding unit, wherein the quality measurement is based on statistical differences between the signal source and a reconstruction of the signal source derived from the previously encoded segment;

re-encoding the signal source according to the allocated target number of bits of each coding unit; and, merging a new bit stream resulting from the re-encoding of the signal source into the original bit stream to replace a bit stream corresponding to said previously encoded segment.

2. The method according to claim 1, wherein the data is video data, said coding units comprising video pictures.

3. The method according to claim 2, wherein said original bit stream is MPEG compliant, said segment re-encoding step implementing an MPEG encoding system.

4. The method according to claim 1, wherein coding units of said segment are re-encoded at a higher or lower bit rate than an encoding bit rate for said segment of said original bit stream.

5. The method according to claim 2, wherein an encoding system implements one or more buffer constraints to ensure proper subsequent decoding operation of said generated bit streams, said method further including the steps of:

adjusting an allocated target bit budget to ensure that the re-encoded segment using the target bit budget conform to said buffer constraints; and, after said new bit stream representation for said segment is merged with the original bit stream, conforming the resulting new bit stream representation to said system constraints.

6. The method according to claim 5, wherein said target number of bits T per segment $F_i$ is calculated according to:

$$T_i = \frac{c_i PQI_i}{\left(\sum_{TP_l=t, l \in S_{2k}} c_l\right) PQI_{S_{2k}}^t} n_k b_p W_t$$

where $c_i$ is a complexity measure of a current picture;

t is the picture coding type $PQI_i$ is the picture quality index of the current picture $F_i$;

$PQI_{S_{2k}}^t$ is an average picture quality index of all pictures with the same picture coding type as picture $F_i$ in a time interval $S_{2k}$;

$$\sum_{TP_l=t, l \in S_{2k}} c_l$$

is the sum of the estimated coding complexity of all pictures in the current time interval $S_{2k}$;

$n_k$ is the number of pictures in interval $S_{2k}$;

$b_p$ is the average number of bits/picture; and, $W_t$ is a weighting factor for picture type of t.

7. The method according to claim 6, wherein $PQI_{S_{2k}}^t$ is calculated according to:

$$\frac{\sum_{TP_l=t, l \in S_{2k}} PQI_l}{n_t}$$

where $TP_1$ is the picture coding type;

$PQI_1$ is the picture quality index of the picture $F_i$; and, $n_t$ is the number of pictures of coding type t in the interval $S_{2k}$.

8. The method according to claim 6, wherein the picture quality index $PQI_i$ is a function of one or a combination of: a distance measure between a reconstructed picture and an original picture, and a subjective measure taking into account of a human visual system's characteristics.

9. The method according to claim 6, wherein said average number of bits per picture $b_p$ is related to said average bit rate per coding unit, said method further including the step of enabling a user to specify either said average number of bits per picture or said average bit rate per coding unit.

10. The method according to claim 6, wherein one system constraint includes no occurrence of buffer underflow, said step of adjusting an allocated target bit budget including the steps of:
   a) determining if a potential buffer underflow condition exists at a current picture $F_i$;
   b) calculating an amount of bits over allocated;
   c) determining a total amount of target bits allocated to all the pictures between a picture index position $i_1$ where a full buffer level is reached or an initial picture index position and, a picture index position $i_2$ where the potential underflow is detected;
   d) calculating an adjustment factor a based on said total amount of target bits allocated and said amount of bits over allocated;
   e) adjusting the target allocation for all pictures between $i_1$ and $i_2$ according to $T_1 = \alpha * T_1$, where $1 = i_1, i_1+1, \ldots, i_2$; and,
   f) setting i to the next current picture position, and repeat steps a) through e) for all pictures within re-encoded segment $S_2$.

11. The method according to claim 10, wherein said determining step a) includes comparing an allocated target bit budget for picture $F_i$ against a difference between a buffer level before removing the coded data of the ith picture in the re-encoded segment and a predetermined guard band G of bits.

12. The method according to claim 10, further including the step of finding a minimum required buffer fullness at the end of the reencoded segment $S_2$.

13. The method of claim 12, wherein said encoding system generates statistics files comprising information relating to said bit streams, wherein said step of merging a new bit stream representation of the re-encoded coding units into the original bit stream further includes merging corresponding statistics files of said new and original bit streams so that reencoding of successive segments may overlap.

14. A system for reencoding a signal source corresponding to a previously encoded segment of a plurality of segments comprising an original bit stream, each segment of said original data bit stream comprising one or more ordered coded units, the system comprising:
   a storage device comprising statistical information relating to said segments of said original bit stream, said statistical information including a quality measurement, an estimated coding complexity and, a number of coding units per unit time interval of said specified original bit stream segment, wherein the quality measurement is based on statistical differences between the signal source and a reconstruction of the signal source derived from the previously encoded segment;
   a target bit allocator for receiving said statistical information including said quality measurement and allocating said target number of bits for said segment as a function of said statistical information including said quality measurement and a target average bit rate per coding unit;
   an encoding device for reencoding the signal source corresponding to the previously encoded segment of said original data bit stream according to said allocated target number of bits; and,
   a device for merging a new bit stream resulting from the reencoding of the signal source into the original bit stream to replace a bit stream corresponding to said previously encoded segment.

15. The system method according to claim 14, wherein the data is video data, said coding units comprising video pictures.

16. The system according to claim 15, wherein said original bit stream is MPEG compliant, said segment re-encoding step implementing an MPEG encoding system.

17. The system according to claim 14, wherein encoding device re-encodes said specified segment of coding units of said segment are re-encoded at a higher or lower bit rate than an encoding bit rate for said segment of said original bit stream.

18. The system according to claim 15, wherein said encoding system implements a decoder having a decoder buffer device characterized as imposing one or more buffer constraints to ensure proper subsequent decoding operation of said generated bit streams, said target encoder device adjusting an allocated target bit budget to ensure that the re-encoded segment using the target bit budget conforms to said buffer constraints, and, that a resulting new bit stream comprising said new bit stream representation merged with the original bit stream conforms to said system constraints.

19. The system according to claim 18, wherein said target number of bits T per picture $F_i$ is calculated according to:

$$T_i = \frac{c_i PQI_i}{\left(\sum_{TP_l=t, l \in S_{2k}} c_l\right) PQI_{S_{2k}}^t} n_k b_p W_t$$

where $c_i$ is a complexity measure of a current picture;
t is the picture coding type;
$PQI_i$ is the picture quality index of the current picture $F_i$;
$PQI_{S_{2k}}^t$ is an average picture quality index of all pictures with the same picture coding type as picture $F_i$ in a time interval $S_{2k}$;

$$\sum_{TP_l=t, l \in S_{2k}} c_l$$

is the sum of the estimated coding complexity of all pictures in the current time interval $S_{2k}$;
$n_k$ is the number of pictures in interval $S_{2k}$;
$b_p$ is the average number of bits/picture; and,
$W_t$ is a weighting factor for picture type of t.

20. The system according to claim 19, wherein $PQI_{S_{2k}}^t$ is calculated according to:

$$\frac{\sum_{TP_l=t, l \in S_{2k}} PQI_l}{n_t}$$

where $TP_1$ is the picture coding type;
$PQI_1$ is the picture quality index of the picture $F_i$; and,
$n_t$ is the number of pictures of coding type t in the interval $S_{2k}$.

21. The system according to claim 19, wherein the picture quality index $PQI_i$ is a function of one or a combination of: a distance measure between a reconstructed picture and an original picture, and a subjective measure taking into account of a human visual system's characteristics.

22. The system according to claim 19, wherein said average number of bits per picture $b_p$ is related to said average bit rate per coding unit, said system further including interface device for enabling a user to specify either said average number of bits per picture or said average bit rate per coding unit.

23. The system according to claim 18, wherein one buffer constraint includes no occurrence of decoder buffer underflow, said encoder device further including:
- a device for determining if a potential buffer underflow condition exists at a current picture $F_i$, and if said potential underflow condition exists, calculating an amount of bits over allocated;
- device for determining a total amount of target bits allocated to all the pictures between an interval defined between a picture index position $i_1$ where a full buffer level is reached or an initial picture index position and, a picture index position $i_2$ where the potential underflow is detected;
- a device for calculating an adjustment factor a based on said total amount of target bits allocated and said amount of bits over allocated and adjusting the target allocation for all pictures between $i_1$ and $i_2$ according to $T_1=\alpha*T_1$, where $l=i_1$. $i_1+1$, . . . , $i_2$, wherein said potential underflow determination and said adjustments are repeated for all pictures within said re-encoded segment $S_2$.

24. The system according to claim 23, wherein said device for determining if a potential buffer underflow condition exists at a current picture $F_i$ includes a comparator device for comparing an allocated target bit budget for picture $F_i$ against a difference between a decoder buffer level before removing the coded data of the ith picture in the re-encoded segment and a predetermined guard band G of bits.

25. The system according to claim 23, further including a means for determining a minimum required buffer fullness at the end of the reencoded segment $S_2$.

26. The system of claim 24, wherein said encoder device generates said statistics information comprising information relating to said bit streams for storage in said storage device, said system further including merging corresponding statistics files of new and original bit streams so that reencoding of successive segments may overlap.

* * * * *

UNITED STATES PATENT AND TRADEMARK OFFICE
CERTIFICATE OF CORRECTION

PATENT NO. : 6,522,693 B1  
DATED : February 18, 2003  
INVENTOR(S) : Ligang Lu et al.

Page 1 of 1

It is certified that error appears in the above-identified patent and that said Letters Patent is hereby corrected as shown below:

Column 7,
Line 31, delete "dr"

Column 15,
Line 14, "a" should read -- α --

Column 17,
Line 13, "a based" should read -- α based --

Signed and Sealed this

Nineteenth Day of August, 2003

JAMES E. ROGAN
*Director of the United States Patent and Trademark Office*